Patented Mar. 4, 1941

2,233,607

UNITED STATES PATENT OFFICE 2,233,607

ESTER OF NITRO ALCOHOL

Henry B. Hass, West Lafayette, Ind., and Byron M. Vanderbilt, Cranford, N. J., assignors to Purdue Research Foundation, La Fayette, Ind., a corporation of Indiana No Drawing. Application May 1, 1940, Serial No. 332,690

1 Claim. (Cl. 260—488)

Our invention relates to a new and useful ester of an aliphatic nitro alcohol. More particularly, it relates to 2-methyl-2-nitrobutyl acetate which possesses the following structural formula:

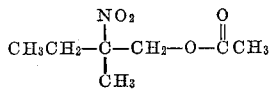

The above compound may be prepared in accordance with any suitable procedure known to the art, such as, for example, by reacting the corresponding nitro alcohol with glacial acetic acid or ketene. We prefer, however, to prepare this ester by reacting the nitro alcohol with approximately an equivalent amount of acetic anhydride in the presence of a small quantity of an acid catalyst such as sulfuric or phosphoric acids and a third liquid capable of forming an azeotrope with water. In carrying out this procedure, the acetic anhydride is added slowly to the nitro alcohol at a temperature of from 50-60° C., the mixture being preferably maintained at this temperature level throughout the addition of acetic anhydride. The reaction which takes place during the formation of this ester is exothermic and precautions should therefore be taken to avoid excessively high temperatures since such conditions have been found to result in yields which are lower than those obtainable when the reaction is carried out under the above-mentioned temperature range. After the entire quantity of acetic anhydride has been added to the nitro alcohol, the resulting mixture is heated to a temperature of 70-80° C. for a period of approximately one-half hour, after which the reaction is substantially complete. The principal impurity contained in such mixture consists of acetic acid which may be separated therefrom by subjecting the crude reaction mixture to distillation under reduced pressure. The residue, consisting chiefly of the ester may be further purified by treatment with water, thus extracting the acid catalyst and any acetic acid which was not removed during the distillation step. If layer separation between the ester and water is difficult to effect, a small amount of a salt such as sodium chloride may be added to the mixture, after which said ester may be readily separated. The product obtained in this manner is, in general, sufficiently pure for the majority of technical uses. However, if desired, the resulting ester may be further purified by subjecting the same to fractional distillation under vacuum.

The nitro alcohol employed in the preparation of the ester of our invention may be satisfactorily prepared by any suitable procedure known to the art. However, we prefer to prepare this compound in accordance with the process of United States Patent No. 2,135,444 by Byron M. Vanderbilt. In accordance with this process a primary or secondary nitroparaffin and an aliphatic aldehyde are reacted in the presence of an auxiliary solvent such as ethyl alcohol in the presence of an alkaline catalyst such as sodium hydroxide, the aldehyde being slowly added to a solution of the nitroparaffin and catalyst in the auxiliary solvent with thorough agitation.

The preparation of the above compound may be further illustrated by the following specific example:

Example

To 385 parts of weight of 2-methyl-2-nitro-1-butanol, containing 1 part by weight of sulfuric acid, was added 316 parts by weight of 95% acetic anhydride. The acetic anhydride was added slowly and the temperature of the reaction mixture was maintained between 50-60° C. When the addition of acetic anhydride was complete, the reaction mixture was heated at a temperature of 75° C. for a period of ½ hour, after which the crude product was distilled under reduced pressure at a temperature sufficient to substantially free said mixture of the acetic acid formed during the esterification. The product obtained in this manner was then further purified by washing with a dilute salt solution after which the water layer was separated and the ester layer distilled under vacuum. The resulting distillate consisting of 2-methyl-2-nitrobutyl acetate, amounted to 424 parts by weight.

The ester prepared as described above is a colorless liquid possessing a pleasant odor and is relatively thermostable. However, at atmospheric pressure it distills at a temperature of 227° C. with slight decomposition.

The following properties were determined for 2-methyl-2-nitrobutyl acetate:

Boiling point at 10 mm_____degree centigrade__100
Refractive index $n_D^{20}$_____ 1. 4350
Specific gravity at $d_4^{25}$_____ 1. 0932

While the above data will no doubt be helpful in the identification of this compound, we do not desire to limit ourselves to an ester having these specific properties since the above data were obtained from a single preparation.

The ester of the present invention has been found to be a satisfactory solvent for various nitrocellulose compositions and may be used in conjunction with such compositions where a high boiling solvent is desired. This compound is similarly useful as an intermediate in the synthesis of various organic compounds. Other uses of this new ester will be apparent to those skilled in the art.

Our invention now having been described, what we claim is:

2-Methyl-2-nitro-1-butyl acetate.

HENRY B. HASS.
BYRON M. VANDERBILT.